US012057808B2

(12) United States Patent
Wang et al.

(10) Patent No.: US 12,057,808 B2
(45) Date of Patent: Aug. 6, 2024

(54) PHOTOVOLTAIC SYSTEM

(71) Applicant: Suzhou Northern Electric Power Technology Co., Ltd., Suzhou (CN)

(72) Inventors: Fan Wang, San Marino, CA (US); Jing Wang, Palo Alto, CA (US)

(*) Notice: Subject to any disclaimer, the term of this patent is extended or adjusted under 35 U.S.C. 154(b) by 215 days.

(21) Appl. No.: 17/870,568

(22) Filed: Jul. 21, 2022

(65) Prior Publication Data

US 2023/0336120 A1 Oct. 19, 2023

(51) Int. Cl.
*H02S 40/36* (2014.01)
*H02J 13/00* (2006.01)

(52) U.S. Cl.
CPC ........ *H02S 40/36* (2014.12); *H02J 13/00006* (2020.01); *H02J 2300/24* (2020.01)

(58) Field of Classification Search
CPC ..... H02S 40/36; H02J 13/00; H02J 13/00006; H02J 2300/24
See application file for complete search history.

(56) References Cited

U.S. PATENT DOCUMENTS

2011/0115300 A1* 5/2011 Chiang ............ H01L 31/02021
307/82

* cited by examiner

*Primary Examiner* — Robert L Deberadinis
(74) *Attorney, Agent, or Firm* — Paul D. Chancellor; Ocean Law

(57) ABSTRACT

One or more of the photovoltaic panel controllers determine according to specific information in a control signal whether to control one or more photovoltaic panels according to the control signal.

11 Claims, 3 Drawing Sheets

PHOTOVOLTAIC SYSTEM

PRIORITY CLAIM AND INCORPORATION BY REFERENCE

This application claims priority to Chinese patent application number 202210385328.4 filed Apr. 13, 2022 and entitled Photovoltaic System by inventors Fan Wang and Jing Wang which is, by this reference, incorporated herein in its entirety and for all purposes.

BACKGROUND OF THE INVENTION

Field of the Invention

The present invention relates to an article of manufacture and in particular to a photovoltaic system and process.

Discussion of the Related Art

In a photovoltaic system, the working state of the photovoltaic panel is usually controlled by a signal controller. Thus signal interaction between the signal controller and the photovoltaic panel is required. The control signal of the signal controller is sent to the photovoltaic panel controller, and the photovoltaic panel controller controls the working state of the corresponding photovoltaic panel according to the control signal, for example, connecting or disconnecting the photovoltaic panel.

At present, a "heartbeat" signal is used in the US SunSpec Communication Protocol. When the heartbeat signal disappears, a safe disconnection is triggered. (Note: SunSpec Alliance is the information standards and certification organization for the Distributed Energy Resource (DER) industry. SunSpec communication standards address operational requirements of solar and energy storage on the smart grid.)

The control signal is a high-frequency signal that propagates through the photovoltaic cables after high-frequency modulation, that is, photovoltaic cable carrier communication. Due to the high frequency nature of the signal, electromagnetic radiation will be emitted through long-distance photovoltaic cable transmission, resulting in the photovoltaic panel controller in one photovoltaic system receiving the control signal from another signal controller in another photovoltaic system. In addition, since the control signals sent by all signal controllers have the same frequency and modulation, the photovoltaic panel controller that receives another control signal will be affected unexpectedly due to this_crosstalk. For example, the signal controller A sends out the "off" signal or stops sending the heartbeat signal of conduction, and another controller B sends out the "on" signal, and the photovoltaic panel controller connected to the signal controller A may receive the "on" signal of controller B due to crosstalk. This will cause the photovoltaic panel to enter the conducting state, causing the photovoltaic system to run out of control.

SUMMARY OF THE INVENTION

The present invention can effectively avoid the loss of control of the photovoltaic system caused by the crosstalk of the control signals from multiple signal controllers.

In a first aspect, an embodiment of the present application provides a photovoltaic system, including: a converter, the converter has a DC current input terminal and an AC current output terminal; a signal controller, the signal controller is connected to the DC current input terminal, and sends a control signal, wherein the control signal includes specific information of the signal controller which may be referred to as a signal controller tag; one or more photovoltaic panel controllers, respectively, receive the control signal; one or more photovoltaic panels, respectively, with one or more of the photovoltaic panel controllers connected; wherein, one or more of the photovoltaic panel controllers determine whether to control the connected one or more photovoltaic panel controllers according to the specific information in the control signal.

In one implementation of the above-mentioned invention, the one or more photovoltaic panel controllers store pre-stored information respectively, wherein when the received specific information matches the pre-stored information, one or a plurality of the photovoltaic panel controllers control the connected one or more photovoltaic panels according to the control signal, and when the received specific information does not match the pre-stored information, the photovoltaic panel controller does not control the connected photovoltaic panel(s) in accordance with the control signal.

In another implementation of the above-mentioned invention, the control signal further comprises a label information indicating the photovoltaic panel controller. When the label information received by the photovoltaic panel controller matches the label that corresponds to the photovoltaic panel controller, the photovoltaic panel controller controls the connected photovoltaic panel according to the control signal.

The control signal further comprises a command signal, wherein, the photovoltaic panel controller controlling the connected photovoltaic panel controls the connected photovoltaic panel according to the command signals.

In one implementation of the above-mentioned invention, the specific information is added to the control signal by using any of time division multiplexing, frequency division multiplexing, code division multiplexing or a combination thereof.

In one implementation of the above-mentioned invention, the specific information and the label information are added to the control signal by using any of time division multiplexing, frequency division multiplexing, code division multiplexing or a combination thereof.

In one implementation of the above-mentioned invention, the specific information is any of a communication address, a device name, or a combination thereof.

In one implementation of the above-mentioned invention, the converter is a photovoltaic inverter.

In one implementation of the above-mentioned invention, the signal controller is connected to one or more photovoltaic panel controllers via one or more photovoltaic cables, respectively, wherein the control signal is sent to one or more of the photovoltaic panel controllers via the one or more photovoltaic cables.

In one implementation of the above-mentioned invention, the one or more photovoltaic panel controllers respectively include a memory for saving the pre-stored information.

The photovoltaic system of the present invention can effectively avoid the loss of control of the photovoltaic system caused by the crosstalk involving control signals of different signal controllers.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

DESCRIPTION OF THE PREFERRED EMBODIMENTS

Embodiments of the present invention are described below by specific examples. It should be noted that in this specification like numerals and letters refer to like items in the following figures so that once an item is defined in one figure, it need not be used in subsequent figures.

The terms "first", "second", etc. are only used to differentiate the description, do not denote any order, and should not be construed as indicating or implying relative importance.

Figure 1:
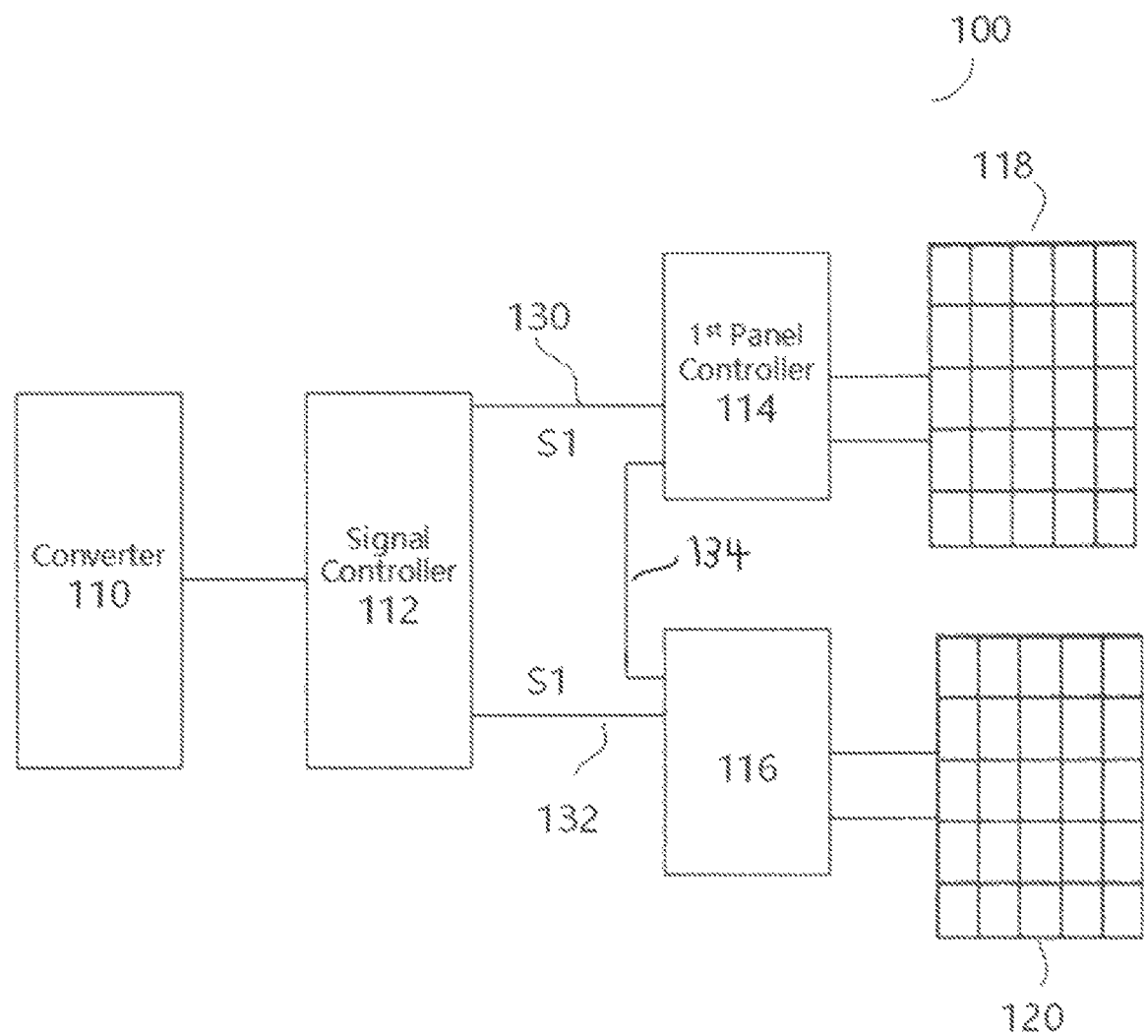
FIG. 1 shows a schematic structural diagram of a photovoltaic system according to the present invention.

FIG. 1 shows a schematic structural diagram of a photovoltaic system 100 according to the present invention. Photovoltaic system 100 includes one or more photovoltaic panels within a photovoltaic array, such as first photovoltaic panel 118 and second photovoltaic panel 120. The first photovoltaic panel 118 may be connected to the converter 110 via a first photovoltaic cable 130 and the second photovoltaic panel 120 may be connected to the converter 110 via a second photovoltaic cable 132. The converter 110 is, for example, a photovoltaic inverter adapted to convert DC current received from the photovoltaic array into AC current supplied to the distribution network.

In this embodiment, as shown in FIG. 1, the photovoltaic system 100 includes a converter 110, a signal controller 112, a first photovoltaic panel controller 114, a second photovoltaic panel controller 116, a first photovoltaic panel 118 and a second photovoltaic panel 120. Only two photovoltaic panel controllers and two photovoltaic panels are shown in FIG. 1, but it is understood that these are just examples, and the number of photovoltaic panel controllers and photovoltaic panels may be any number.

Converter 110 has a direct current (DC) input and an alternating current (AC) output. It will be appreciated that the direct current (DC) input receives DC current from the photovoltaic array and the alternating current (AC) output supplies the converted AC current to the distribution network.

The signal controller 112 is connected to the DC current input terminal of the converter 110 and sends the control signal S1. The control signal S1 is sent to the first photovoltaic panel controller 114 and the second photovoltaic panel controller 116 via the first photovoltaic cable 130, the second photovoltaic cable 132, and the photovoltaic cable 134 which connects the first photovoltaic panel controller 114 and the second photovoltaic panel controller 116. It can be understood that the control signal S1 is a high-frequency signal propagated through the photovoltaic cable after high-frequency modulation.

The control signal S1 includes specific information of the signal controller 112 that identifies the source of the control signal is signal controller 112. The specific information comprises, for example, the communication address, device name of the signal controller 112 or a combination thereof. In this embodiment, the specific information is, for example, the communication address A1 of the signal controller 112.

In this embodiment, the communication address A1 may be added to the control signal S1 by using any of time division multiplexing, frequency division multiplexing, code division multiplexing or a combination thereof.

The first photovoltaic panel controller 114 is connected to the first photovoltaic panel 118, and the second photovoltaic panel controller 116 is connected to the second photovoltaic panel 120. The first photovoltaic panel controller 114 and the second photovoltaic panel controller 116 respectively receive the control signal S1 and determine whether to control the first photovoltaic panel 118 and the second photovoltaic panel 120 according to the communication address A1 in the control signal S1.

The first photovoltaic panel controller 114 and the second photovoltaic panel controller 116 have pre-stored information, such as a pre-stored communication address A. The first photovoltaic panel controller 114 and the second photovoltaic panel controller 116 each contain memory, for example non-volatile memory, for storing pre-stored information. It will be appreciated that the pre-stored information can be modified by modifying the data stored in the non-volatile memory.

The first photovoltaic panel controller 114 controls the connected first photovoltaic panel 118 according to the received control signal S1 when determining that the communication address A1 in the received control signal S1 matches the pre-stored communication address A. When the first photovoltaic panel controller 114 determines that the communication address A1 in the control signal S1 does not match the pre-stored communication address A, the connected first photovoltaic panel 118 is not controlled according to the received control signal S1.

It can be understood that the matching between the communication address A1 in the control signal S1 and the pre-stored communication address A in the first photovoltaic panel controller 114 means that the communication address A1 in the control signal S1 is consistent with the pre-stored communication address A in the first photovoltaic panel controller 114.

Similarly, the second photovoltaic panel controller 116 controls the connected second photovoltaic panel 120 when determining that the communication address A1 in the received control signal S1 matches the pre-stored communication address A in the second photovoltaic panel controller 116. When the second photovoltaic panel controller 116 determines that the communication address A1 does not match the pre-stored communication address A, the connected second photovoltaic panel 120 is not controlled according to the received control signal S1.

In this embodiment, for example, the communication address A1 in the control signal S1 matches the pre-stored communication address A in the first photovoltaic panel controller 114 and the second photovoltaic panel controller 116, then the first photovoltaic panel controller 114 and the second photovoltaic panel controller 116 control the first photovoltaic panel 118 and the second photovoltaic panel 120 respectively.

The control signal S1 also includes a command signal, and the photovoltaic panel controller controlling the connected photovoltaic panel means that the photovoltaic panel controller controls the connected photovoltaic panel according to the command signal. The command signal is, for example, "on" or "off", wherein "on" refers to connecting the photovoltaic panel, and "off" refers to disconnecting the photovoltaic panel.

For example, when the command signal in the control signal S1 is "on", the first photovoltaic panel controller 114 connects the first photovoltaic panel 118 and the second photovoltaic panel controller 116 connects the second photovoltaic panel 120.

Figure 2:
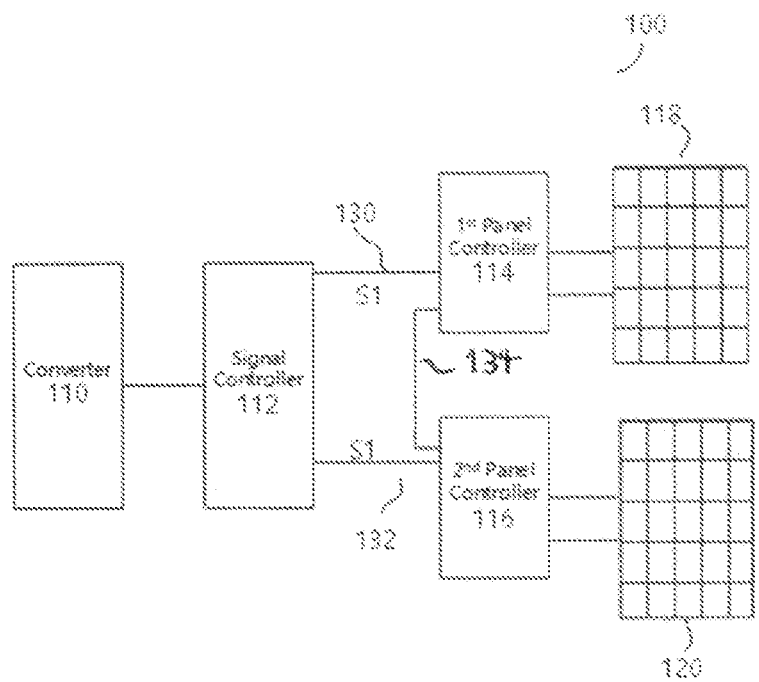
FIG. 2 shows a schematic diagram of two photovoltaic systems according to the present invention.
Figure 2:
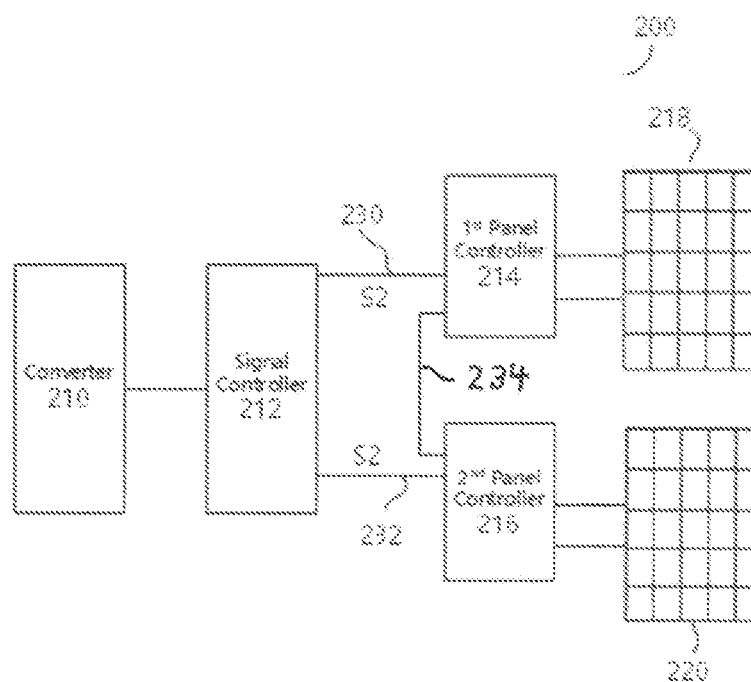

Referring to FIG. 2, another photovoltaic system 200 is shown similar to the photovoltaic system 100 in FIG. 1, the photovoltaic system 200 is similar in structure to the photovoltaic system 100, and includes a converter 210, a signal controller 212, a first photovoltaic panel control controller 214, second photovoltaic panel controller 216, first photovoltaic panel 218 and second photovoltaic panel 220. The first photovoltaic panel 218 may be connected to the converter 210 via a first photovoltaic cable 230 and the second photovoltaic panel 220 may be connected to the converter 210 via a second photovoltaic cable 232.

The second signal controller 212 sends the control signal S2 to the first photovoltaic panel controller 214 and the second photovoltaic panel controller 216 via the first photovoltaic cable 230 and the second photovoltaic cable 232 and the photovoltaic cable 234 which connects the first photovoltaic panel controller 214 and the second photovoltaic panel controller 216. The control signal S2 includes a specific signal of the signal controller 212, such as the communication address A2 of the signal controller 212.

The photovoltaic system 100 may be located in the vicinity of the photovoltaic system 200, for example. Crosstalk may occur, for example, when the first photovoltaic panel controller 114 of system 100 receives the control signal S2 sent from the signal controller 212, the first photovoltaic panel controller 114 of system 100 determines the communication address A2 in the control signal S2 and the pre-stored communication address A in the first photovoltaic panel controller 114 of system 100 does not match, so the first photovoltaic panel 118 of system 100 will not be controlled according to the command signal in the control signal S2 of system 200, thereby preventing the photovoltaic system 100 from running out of control.

Therefore, the present invention can effectively avoid the loss of control of the photovoltaic system caused by the crosstalk of the control signals of different signal controllers.

Further, the control signal S1 also includes a label indicating the photovoltaic panel controller. When the specific information received by the photovoltaic panel controller matches the pre-stored information, and the label corresponds to the photovoltaic panel controller, the photovoltaic panel controller controls the connected photovoltaic panels.

For example, the control signal S1 further includes a label L114 indicating the first photovoltaic panel controller 114. In this embodiment, any of time division multiplexing, frequency division multiplexing, code division multiplexing or a combination thereof may be used to associate the communication address A1 with the label L114.

After the first photovoltaic panel controller 114 receives the control signal S1, when it is determined that the communication address A1 in the control signal S1 matches the pre-stored communication address A, and the label L114 corresponds to the first photovoltaic panel controller 114, the first photovoltaic panel controller 114 controls the first photovoltaic panel 118 according to the received signal S1. When the command signal in the control signal S1 is "on", the first photovoltaic panel controller 114 connects the first photovoltaic panel 118.

It can be understood that after the second photovoltaic panel controller 116 receives the control signal S1, it determines that the communication address A1 in the control signal S1 matches the pre-stored communication address A but determines that the label L114 does not correspond to the second photovoltaic panel controller 116. The controller 116, at this time, will not control the second photovoltaic panel 120 according to the control signal S1.

In this way, the present invention can further control different photovoltaic panels according to the control signal.

One PV panel controller in each PV system shown in FIGS. 1-2 controls one PV panel, but it will be appreciated that one PV panel controller can control two or more PV panels without limitation.

Figure 3:
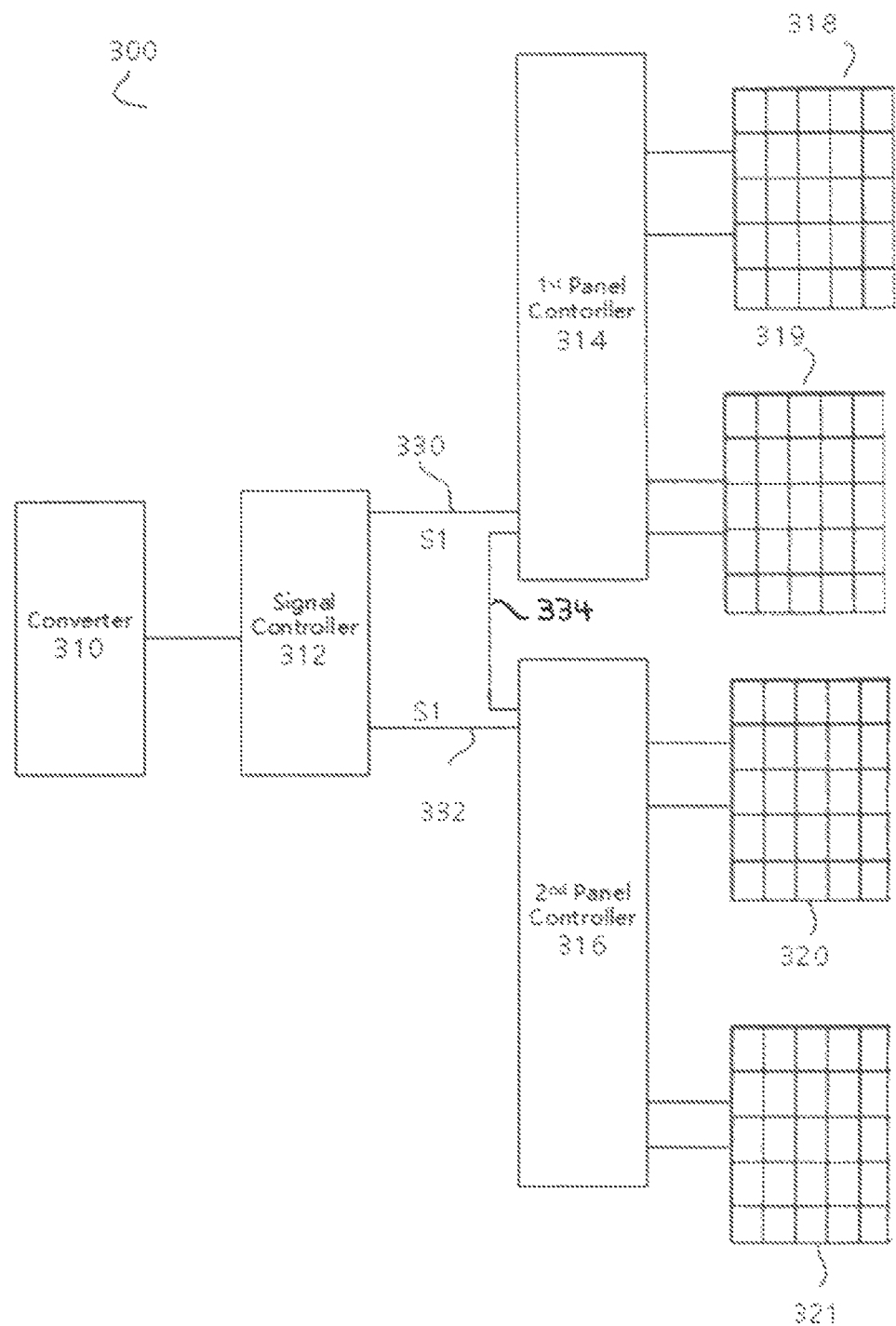
FIG. 3 shows a schematic structural diagram of a photovoltaic system according to another embodiment of the present invention.

FIG. 3 shows a schematic structural diagram of a photovoltaic system 300 according to another embodiment of the present invention. The photovoltaic system 300 includes a converter 310, a signal controller 312, a first photovoltaic panel controller 314, a second photovoltaic panel controller 316, a first photovoltaic panel 318, a second photovoltaic panel 319, a third photovoltaic panel 320, and a fourth photovoltaic panel 321. Signal S1 reaches first and second panel controllers 314 and 316 via photovoltaic cable 330 and 332. Photovoltaic cable 334 interconnects the first and second panel controllers.

The functions of each component in FIG. 3 are similar to those in FIG. 1, the difference is that the first photovoltaic panel controller 314 in FIG. 3 can control the first photovoltaic panel 318 and the second photovoltaic panel 319 at the same time, and the second photovoltaic panel controller 316 can control the third photovoltaic panel 320 and the fourth photovoltaic panel 321 simultaneously.

It will be appreciated that, in the above description of exemplary embodiments of the invention, various features of the invention are sometimes grouped together into a single embodiment, figure, or in its description. This disclosure, however, should not be construed as reflecting an intention that the invention as claimed requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A photovoltaic system comprising:
   a converter with a DC current input terminal and an AC current output terminal;
   a signal controller connected to the DC current input terminal;
   the signal controller sends a control signal that includes specific information of the signal controller;
   one or more photovoltaic panel controllers respectively receive the control signal; and,
   one or more photovoltaic panels respectively connected with one or more of the photovoltaic panel controllers;
   wherein, the one or more of the photovoltaic panel controllers determine, according to the specific information whether to control the one or more photovoltaic panels according to the control signal.

2. The photovoltaic system of claim 1 wherein pre-stored information is stored in one or more of the photovoltaic panel controllers such that only when the received specific information matches the pre-stored information do the one or more photovoltaic panel controllers control the connected one or more photovoltaic panels according to the control signal.

3. The photovoltaic system of claim 2 further comprising a label indicating a particular photovoltaic panel controller such that when the specific information received by the photovoltaic panel controller matches the pre-stored information and the label matches the particular photovoltaic panel controller the photovoltaic panel controller controls the connected photovoltaic panel according to the control signal.

4. The photovoltaic system of claim 3 further comprising a command signal such that the photovoltaic panel controller controls the connected photovoltaic panel according to the command signal.

5. The photovoltaic system of claim 4 wherein the specific information is added to the control signal using time division multiplexing, frequency division multiplexing, code division multiplexing, or a combination thereof.

6. The photovoltaic system of claim 4 wherein the specific information and the label are added to the control signal by using time division multiplexing, frequency division multiplexing, code division multiplexing, or a combination thereof.

7. The photovoltaic system of claim 4 wherein the specific information further comprises a communication address, a device name or a combination thereof.

8. The photovoltaic system of claim 4 wherein the converter further comprises a photovoltaic inverter.

9. The photovoltaic system of claim 4 wherein the signal controller is connected to one or more of the photovoltaic panel controllers via respective photovoltaic cables.

10. The photovoltaic system of claim 4 wherein the photovoltaic panel controllers each comprise non-volatile memory for storing the pre-stored information.

11. A photovoltaic system comprising:
a converter with a DC current input terminal and an AC current output terminal;
a signal controller connected to the DC current input terminal;
the signal controller sends a control signal that includes a tag of the signal controller;
one or more photovoltaic panel controllers respectively receive the control signal; and,
one or more photovoltaic panels respectively connected with one or more of the photovoltaic panel controllers;
wherein, the one or more of the photovoltaic panel controllers determine, according to the tag, whether to control the photovoltaic panels according to the control signal.

* * * * *